United States Patent Office 2,924,489
Patented Feb. 9, 1960

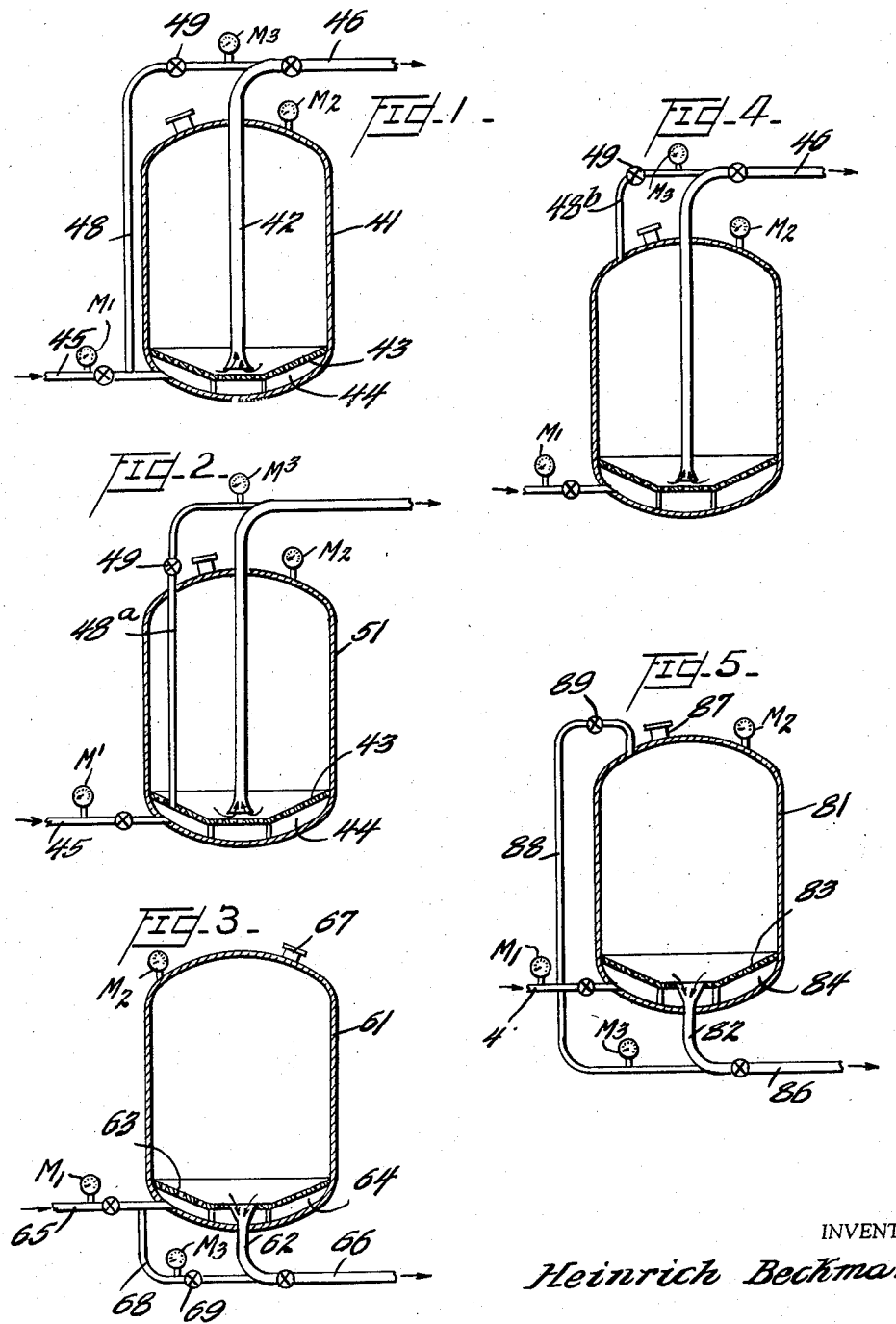

2,924,489

PROCESS AND APPARATUS FOR CONVEYING FINELY DIVIDED MATERIAL

Heinrich Beckmann, Neubeckum, Germany

Original application November 9, 1954, Serial No. 467,851. Divided and this application February 27, 1957, Serial No. 644,288

3 Claims. (Cl. 302—53)

The present invention relates to a process and apparatus for conveying finely divided powdered or granular material by means of compressed air from pressure tanks having a porous or false bottom, in which a discharge pipe extending in the desired direction from the tank is so arranged that the material inlet opening of the discharge pipe, which opening is preferably formed in the shape of a flared nozzle, is continuously directly vented so as to assure an undisturbed discharge of the material, venting being achieved either by the same air which flows through all or part of the porous bottom and places the material in an essentially fluid condition, or by a flow of air separated from the air prior to its passage through the bottom.

This application is a divisional application of my application Serial No. 467,851, filed November 9, 1954, which has subsequently become abandoned.

The porous bottom can be formed in various ways. It can extend flat or be subdivided in which case the portion above which the inlet opening of the discharge pipe is located is lower than the adjacent portions with the latter portions being inclined upwardly toward the tank wall. The bottom can also take the general configuration of an inverted gable so that a plane through the locus of juncture of the inclined sections coincides with the axis of the discharge pipe. The invention is not limited merely to vertical tanks, but is also applicable to horizontal, stationary tanks and particularly to tanks mounted on vehicles.

The pneumatic conveyance takes place in a known manner, compressed air being introduced into the air space below the porous bottom, penetrating in an extremely fine state of division only those areas of the porous bottom on which the column of material rests. The air passes through the material and egresses by way of the discharge pipe into a conveyor line, carrying with it quantities of the material which are thus placed in essentially fluid condition. By entering the tank from the bottom and in an extremely finely-divided state, the air functions to loosen the material and prevents it from packing which facilitates the discharge action. The advantage of this type of pressure conveyance, with areal loosening, is that the smallest possible expenditure of energy is required for bringing the loosened material into the conveyor line. This method, however, can only be carried out in special cases, adaptation to the manifold requirements of pneumatic pressure conveyance being possible only within narrow limits. The simultaneous compliance with the loosening requirements of the material and the conditions made necessary by the length and diameter of the conveyance line is therefore not possible in all cases inasmuch as the loosening properties of materials differ greatly and the necessary concentration of the material-air mixture is dependent on the material, as well as on the conditions determined by the conveyor line. Under the same conditions with regard to the conveyor line, cement, chalk, and grain, for example, differ greatly from each other. In accordance with this invention it has been determined that the conveyance of the widest variety of materials, with continuous loosening of the material under the varied conditions of the conveyor line, is made possible if the total quantity of air required for the conveyance of a given material under the prevailing conditions is split up into partial quantities.

In the case of long conveyor lines, which, as is well known, have a relatively high air requirement, and in the case of materials whose requirement of loosening air is relatively low, the conveyor air required should not be passed all at once through the porous bottom inasmuch as this would result in a material-air mixture of excessively high concentration entering the conveyor line, and would require an excessively high pressure to avoid the danger of the line clogging. The total quantity of air must, therefore, be split up or divided into two portions, the first penetrating via the porous bottom areally into the material present in the tank, and loosening it up, which portion, less that volume which replaces the discharging material, conveys the loosened material into the conveyor line, and the second, herein designated as "additional air," conveyed via a separate air line outside or inside the tank, and added to the mixture of material and air adjacent the conveyor line inlet.

Also, in the case of long conveyor lines having a correspondingly high air consumption and with material of a nature which requires the total quantity of conveyor air for loosening purposes, the total conveying air, in order to avoid excessively high pressure or clogging of the line, should not enter the conveyor line together with the loosened material.

In this latter instance, the entire quantity of air necessary for conveyance enters in an areal manner via the porous bottom into the material stored in the tank, and loosens the material, but it is thereupon divided up into a partial quantity of air which with the material in continuously loosened condition enters into the opening of the discharge pipe and into a remaining quantity of air which passes in an areal manner through the material in the tank, collects in the free space above the top of the material, and, except for a small portion thereof which replaces the space left by the discharging material is added to the material-air mixture through an air line adjacent the conveyor line inlet.

Several embodiments of the invention are shown schematically in the drawings, in which:

Figure 1 shows a pressure tank having a sub-divided porous bottom with discharge pipe passing out at the top, and a line for conducting a portion of the air along the outside of the tank;

Figure 2 shows a pressure tank according to Figure 1, in which the separate air line is arranged within the tank;

Figure 3 shows a pressure tank having a discharge pipe conducted downwardly out of the tank and a partial air line;

Figure 4 shows a pressure tank having a discharge pipe passing out at the top, and having a partial air line emerging from the upper part of the tank, which latter line discharges into the conveyor line; and Figure 5 shows a pressure tank having a discharge pipe passing out at the bottom and a partial air line emerging from the upper part of the tank.

As shown in Figure 1, vertical or horizontal pressure tank 41 is provided in its inside with a sub-divided porous bottom 43, sloping downwardly towards the inlet pipe 42. The loosening air is fed to the air space 44 below the porous bottom 43, through the line 45 from any desired source of compressed air. Before the entrance of the air line 45 into the air space 44, a line 48 branches off, this line being provided by a manually adjustable throttle valve 49 and discharging into the conveyor line 46 outside of tank 41. Line 48 functions to conduct a variable portion of the total quantity of compressed air fed into line 45 directly from line 45 to conveyor line 46, bypassing tank 41.

Figure 2 shows a modification of the arrangement, the by-pass air line 48a being disposed within the tank 51 and connected on the inlet side to the air space 44, extending through the porous bottom 43, the remaining elements corresponding to Figure 1. Pressure gauges $M_1$, $M_2$ and $M_3$ may be provided on the tank 41 and the lines 45 and 48a to facilitate the adjustment of throttle valve 49, and thus the regulation of the rate of air flow.

Figure 4 shows a further modification or arrangement for conveying material which requires a large amount of loosening air. The excess quantity of residual air is in this connection fed to the conveyor line 46 from the space located above the material via an air line 48b. Three pressure gauges $M_1$, $M_2$ and $M_3$ make possible in this arrangement also the adjustment of the throttle 49 and thus the regulation of the rate of air flow.

Figure 3 represents an analogous arrangement for the conveying of the material downward out of tank 61, this arrangement not requiring any further explanation. The emptying and conveying process takes place as in the arrangements shown in Figures 1, 2 and 4: The material which has been brought into the tank 61 in a predetermined quantity is after the closure of the inlet opening 67 loosened by the admission of a given quantity of air through line 65, and the passage of a part of this air through the porous bottom 63, and at the same time is forced by the pressure prevailing in the tank into the conveyor line 66 via the inlet pipe 62. A part of the air fed through line 65 by-passes the tank by way of line 68, and passes as additional air into the conveyor line 66, via the throttle valve 69, which can be adjusted, corresponding to the nature of the material, the length of the conveyance path and the diameter of inlet 62. A non-return valve (not shown) is preferably provided in front of the throttle valve 69, to prevent the material passing, in case of disturbances of the installation, via line 68 into line 65, or into air space 64 below the porous bottom, and avoid contamination of the lower side of the porous bottom. Supervision by the operator is substantially facilitated by pressure measuring instruments similar to those previously mentioned so that the operator is able to adjust the air feed properly in case of disturbances.

Figure 5 shows an installation similar to that in Figure 4 for material requiring a large amount of loosening air and in this embodiment the total quantity of air fed through the main air line 85 into space 84 enters into the material in tank 81 through the porous bottom 83, thus assuring that the material is loosened. However, in order to comply with the conveyor-line conditions, a part of the quantity of air is collected in the free space above the top of the material introduced, via a line 88, into conveyor line 86, by-passing the inlet pipe 82. The air to be introduced into the conveyor line 86 can be regulated by the throttle valve 89 installed in line 88. A non-return valve (not shown) may be provided in front of the throttle valve 89 for preventing the material from penetrating into the return line system. The material is, of course, initially introduced through a filling valve 87.

The above described conveying methods make possible not only the conveyance of materials requiring a large amount of loosening air, and having a low permissible concentration, but furthermore, permit, particularly due to the possibility of adjusting the division of the air, adaptation to the manifold conditions of pneumatic conveyance, and finally assure the most economically possible favorable operation of the conveying installation.

The conveyor devices can also be so arranged that all processes can be carried out with a single unit.

It will be obvious to those skilled in the art that various modifications and variations may be made without departing from the broad principles which have been set forth. For example, a combination of the two types of partial air lines may be employed, if desired, one line communicating with the compressed air supply line and the conveyor conduit and the other with a free space within the tank and the conveyor conduit. Hence, I intend that the concept of the invention should be limited only by the appended claims and not by the specific embodiments described and illustrated.

Having thus described my invention, what is claimed as new and desired to be secured by Letters Patent is:

1. Apparatus for discharging and conveying finely divided material of all types by means of compressed air comprising a pressure container, a porous bottom insert in said container, means for injecting air beneath said insert, a discharge conduit in said container having an entrance spaced from said insert, means for feeding fluidizing air to said container to form a conveyable air-particle-emulsion of the finely divided material, and means for continuously injecting additional air into said discharge conduit at a point spaced from said entrance to regulate the concentration of the emulsion and insure the discharge of the correct amount and the correct characteristics of the emulsion.

2. Apparatus according to claim 1 wherein said means for supplying additional air comprises an air feeding pipe connected to the main air supply source and to the discharge conduit at a point outside of said pressure container.

3. Apparatus for discharging and conveying finely divided material of all types by means of a compressed fluid comprising a pressure container, a porous bottom insert in said container, means for supplying fluid to said container at a point below said bottom insert, means for removing a fluid-particle-emulsion of said material comprising an outlet having an opening located above said bottom insert, and means for continuously injecting additional fluid into the removing means from said container to regulate the concentration and the amount of the emulsion being conveyed.

References Cited in the file of this patent

UNITED STATES PATENTS

| | | |
|---|---|---|
| 1,616,547 | Pontoppidan | Feb. 8, 1927 |
| 2,032,367 | Kennedy | Mar. 3, 1936 |
| 2,191,096 | McCurdy | Feb. 20, 1940 |
| 2,258,125 | Robinson | Oct. 7, 1941 |
| 2,587,670 | Weinrich | Mar. 4, 1952 |
| 2,707,132 | Baresch | Apr. 26, 1955 |
| 2,734,782 | Galle | Feb. 14, 1956 |
| 2,739,845 | Berg | Mar. 27, 1956 |

FOREIGN PATENTS

| | | |
|---|---|---|
| 1,074,419 | France | Mar. 31, 1954 |